United States Patent
Robertson

(10) Patent No.: US 8,636,243 B2
(45) Date of Patent: Jan. 28, 2014

(54) ANTI-TORQUE NOZZLE SYSTEM WITH INTERNAL SLEEVE VALVE FOR A ROTORCRAFT

(75) Inventor: Daniel B. Robertson, Southlake, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 13/580,532

(22) PCT Filed: Nov. 12, 2010

(86) PCT No.: PCT/US2010/056571
§ 371 (c)(1),
(2), (4) Date: Aug. 22, 2012

(87) PCT Pub. No.: WO2012/064344
PCT Pub. Date: May 18, 2012

(65) Prior Publication Data
US 2012/0318911 A1    Dec. 20, 2012

(51) Int. Cl.
*B64C 15/00* (2006.01)
*B64C 27/82* (2006.01)

(52) U.S. Cl.
USPC ..................................... 244/17.19; 244/52

(58) Field of Classification Search
USPC ......... 244/17.19, 17.11, 52, 12.3, 12.5, 23 B, 244/23 D, 73 R
See application file for complete search history.

(56) References Cited

U.S. PATENT DOCUMENTS

| 2,486,272 A | 10/1949 | Gazda |
| 3,807,662 A | 4/1974 | Velazquez |
| 4,660,785 A | 4/1987 | Munski |
| 5,205,512 A * | 4/1993 | Rumberger ................. 244/17.19 |

FOREIGN PATENT DOCUMENTS

| GB | 2320477 A | 6/1998 |
| WO | 2006036147 A1 | 4/2006 |

OTHER PUBLICATIONS

Extended European Search Report in related European patent application No. 10859575, 7 pages, Jul. 22, 2013.
International Search Report and the Written Opinion of the International Searching Authority mailed by ISA/USA, U.S. Patent and Trademark Office on Jan. 18, 2011 for International Patent Application No. PCT/US10/56571, 7 pages.
European Office Action in related European patent application No. 10859575.2, dated Nov. 25, 2013.

* cited by examiner

*Primary Examiner* — Tien Dinh
*Assistant Examiner* — Richard R Green
(74) *Attorney, Agent, or Firm* — James E. Walton

(57) ABSTRACT

The system of the present application includes a duct for receiving airflow from within a duct portion of a tailboom. The airflow is a mixture of fan driven air and engine exhaust. The system includes a fixed nozzle assembly with an anti-torque nozzle, a pro-torque nozzle and a thrust nozzle. A rotating sleeve valve is located within the fixed nozzle assembly. The rotating sleeve valve located within the fixed nozzle assembly and is configured to selectively redirect airflow into one or more of the anti-torque nozzle, the pro-torque nozzle and the thrust nozzle.

17 Claims, 5 Drawing Sheets

ANTI-TORQUE NOZZLE SYSTEM WITH INTERNAL SLEEVE VALVE FOR A ROTORCRAFT

TECHNICAL FIELD

The present application relates to rotorcraft. In particular, the present application relates to propulsive anti-torque systems for rotorcraft.

DESCRIPTION OF THE PRIOR ART

A classic helicopter configuration includes a tail rotor for selectively producing a torque upon the helicopter. Helicopters having a single main rotor require a torque canceling device for controlling torque reacting on the airframe from the main rotor. Typically, the torque canceling device is a tail rotor powered by the engine via a tail rotor driveshaft. Conventional tail rotors are unable to provide propulsive force to the helicopter.

Although the developments in helicopter torque systems have produced significant improvements, considerable shortcomings remain.

BRIEF DESCRIPTION OF THE DRAWINGS

The novel features believed characteristic of the system of the present application are set forth in the appended claims. However, the system itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

Figure 1:
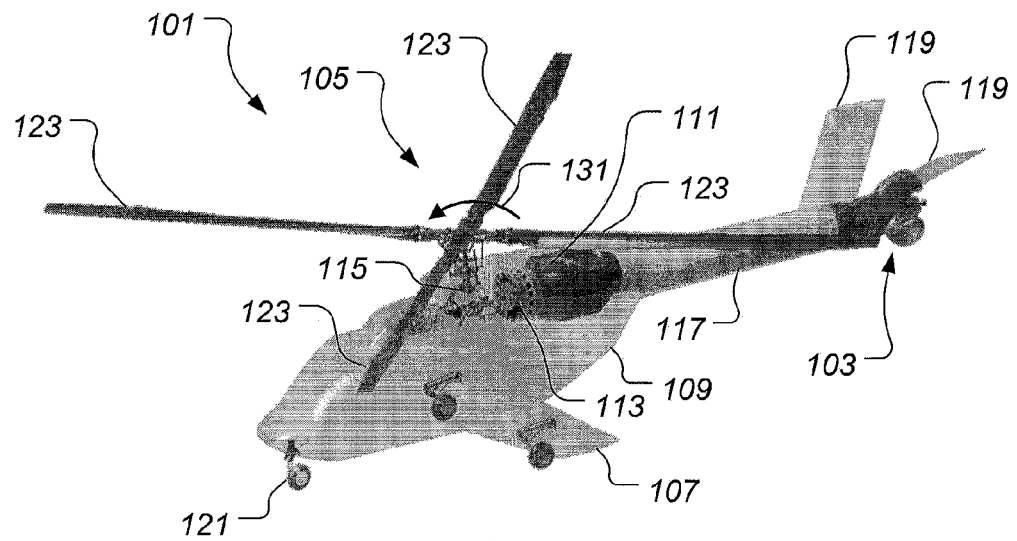
FIG. 1 is a perspective view of a rotorcraft having a propulsive anti-torque system according to the preferred embodiment of the present application.

While the system of the present application is susceptible to various modifications and alternative forms, specific embodiments thereof have been shown by way of example in the drawings and are herein described in detail. It should be understood, however, that the description herein of specific embodiments is not intended to limit the method to the particular forms disclosed, but on the contrary, the intention is to cover all modifications, equivalents, and alternatives falling within the spirit and scope of the application as defined by the appended claims.

DESCRIPTION OF THE PREFERRED EMBODIMENT

Illustrative embodiments of the system of the present application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The propulsive anti-torque system of present application is configured to operate in an aircraft, the aircraft having with a propulsion system with a variable pitch fan installed approximate to an engine in the aircraft. The fan is driven directly from the main rotor drive via a short shaft. The configuration and location of the fan allows the primary exhaust from the engine to be mixed with the air flow from the fan. The mixed air flow from the fan and the engine passes through the tail boom and out the propulsive anti-torque system. All embodiments of the system of the present application may be configured in both manned and unmanned aircraft.

Figure 2:
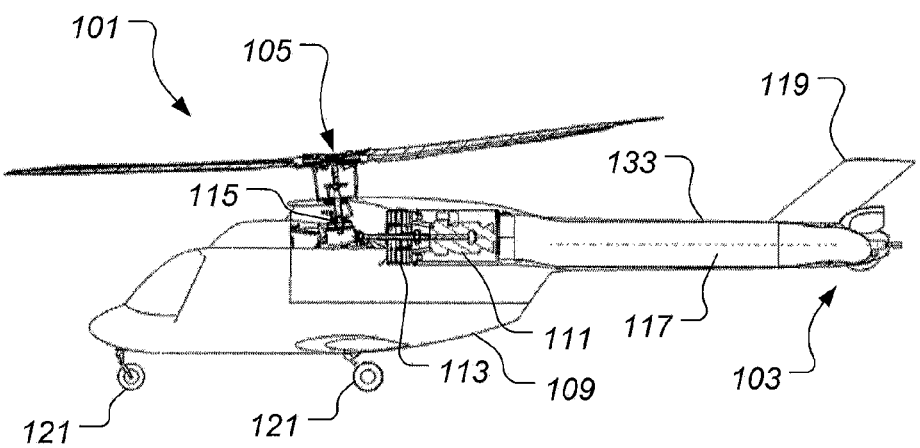
FIG. 2 is a partial cut-away side view of the rotorcraft of FIG. 1.

Referring to FIGS. 1 and 2, aircraft 101 includes a fuselage 109 and a landing gear 121. A rotor system 105 is configured to receive cyclic and collective control inputs thus enabling aircraft 101 to make controlled movements. For example, a collective control input changes the pitch of each rotor blade 123 collectively. In contrast, a cyclic control inputs selectively changes the pitch of individual rotor blades according to a rotation position. For example, as rotor blades 123 rotate, a cyclic input can increase the lift on one side of aircraft 101 and decrease on the other side of the aircraft 101, thus producing a lift differential. In this manner, cyclic control inputs can be made to control the pitch and roll of aircraft, as well as to produce various tilting maneuvers. Even though the preferred embodiment is shown with four rotor blades 123, it should be appreciated that alternative embodiments may use greater or fewer rotor blades.

In the preferred embodiment, aircraft 101 includes a fixed wing 107 extending from each side of fuselage 109. Fixed wing 107 is configured to provide supplemental lift to aircraft 101 during forward flight. During forward flight, wing 107 produces lift, thereby reducing the lifting responsibilities of rotor system 105. The supplemental lift provided by wing 107 acts to reduce vibration, as well as improve the range and efficiency of aircraft 101. It should be appreciated that alternative embodiments of aircraft 101 may not include wing 107. The preferred embodiment of aircraft 101 also includes tail fins 119 which provide aerodynamic stability during flight. It should be appreciated that tail fins 119 may take on a wide variety of configurations. For example, tail fins 119 may be replaced with any combination of horizontal and vertical fins.

Aircraft 101 further includes an engine 111 that provides power to rotor system 105 via a transmission 115. Engine 111 is also configured to provide power to a fan 113. Fan 113 provides compressed airflow to propulsive anti-torque system 103, via a duct 117. In the preferred embodiment, fan 113 has variable pitch fan blades so that flight system controls can control airflow produced by fan 113. Propulsive anti-torque system 103 is configured to selectively provide aircraft with a forward thrust vector, an anti-torque vector, and a pro-torque vector, as described in further detail herein.

Figure 3:
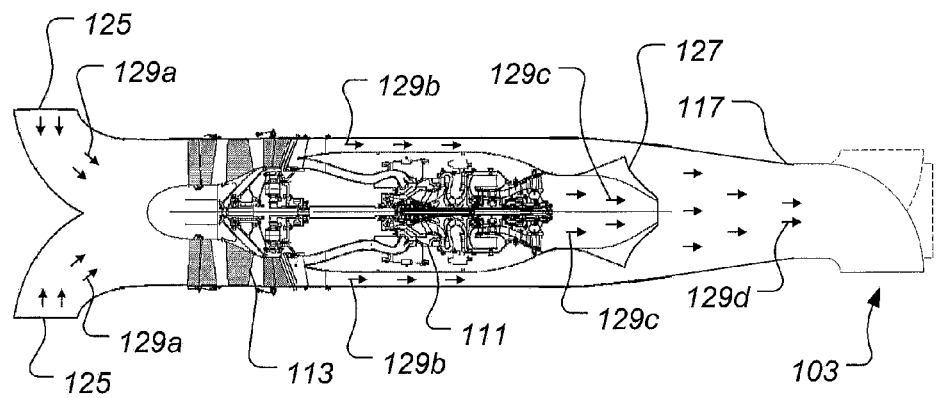
FIG. 3 is a schematic view of a selected portion of the rotorcraft of FIG. 1.
Figure 4:
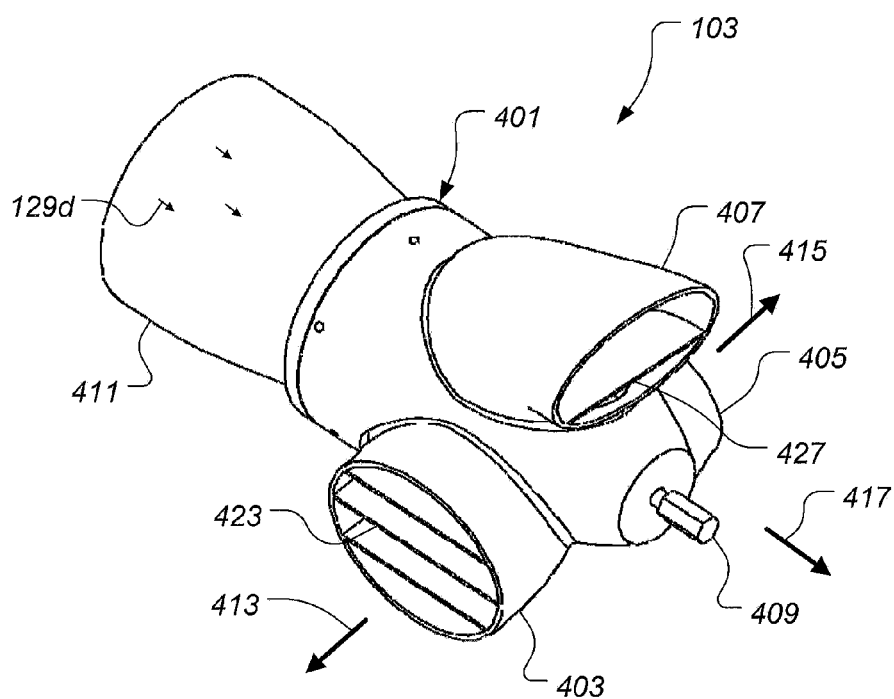
FIG. 4 is a perspective view of the propulsive anti-torque system according the preferred embodiment of the present application.

Referring now to FIG. 3, a portion of aircraft 101 is schematically shown. Propulsive anti-torque system 103 receives compressed air flow via duct 117. Duct 117 is interior to a tailboom 133 (shown in FIG. 2). During operation, inlet air 129a enters an inlet 125 and is accelerated through fan 113. Fan accelerated air 129b travels through a duct system around engine 111 to a mixer portion 127 of duct 117. Exhaust air 129c is expelled from engine 111 and travels to mixer portion 127. Mixer portion 127 is a daisy-type nozzle that provides shear layers for disrupting airflow so as to facilitate mixing of fan accelerated air 129b and exhaust air 129c so as to produce mixed air 129d. The mixing of the hot exhaust air 129c with the cool fan accelerated air 129b acts to reduce the temperature of exhaust air 129c, thereby reducing the infrared (IR) signature of aircraft 101. External acoustic signature is also reduced because the fan and engine components are located internally and sound is dampened in duct 117, before mixed air 129d exits propulsive anti-torque system 103. The mixing also recovers heat energy from the exhaust to develop additional useful thrust over that of the fan alone.

Referring now to FIGS. 4-9, propulsive anti-torque system 103 is shown in further detail. System 103 includes a diverter 411 which is in fluid communication with duct 117. System 103 further includes a fixed nozzle assembly 401 having a various nozzles for selectively producing a thrust component in single or multiple directions. Fixed nozzle assembly 401 includes an anti-torque nozzle 403, a pro-torque nozzle 405, and a thrust nozzle 407. A rotating sleeve valve 419 is located concentrically with fixed nozzle assembly 401. In the preferred embodiment, diverter 411 is integral to rotating sleeve valve 419 such that rotation of rotating sleeve valve 419 results in rotation of diverter 411. Rotating sleeve valve 419 is configured to be selectively rotated by a rotary actuator spindle 409. During operation, mixed air 129d travels into diverter 411 from duct 117. From diverter 411, mixed air 129d travels through downstream portions of rotating sleeve valve 419 (shown in FIGS. 8 and 9). Rotating sleeve valve 419 selectively redirects mixed air 129d into one or more of anti-torque nozzle 403, pro-torque nozzle 405, and thrust nozzle 407.

Figure 8:
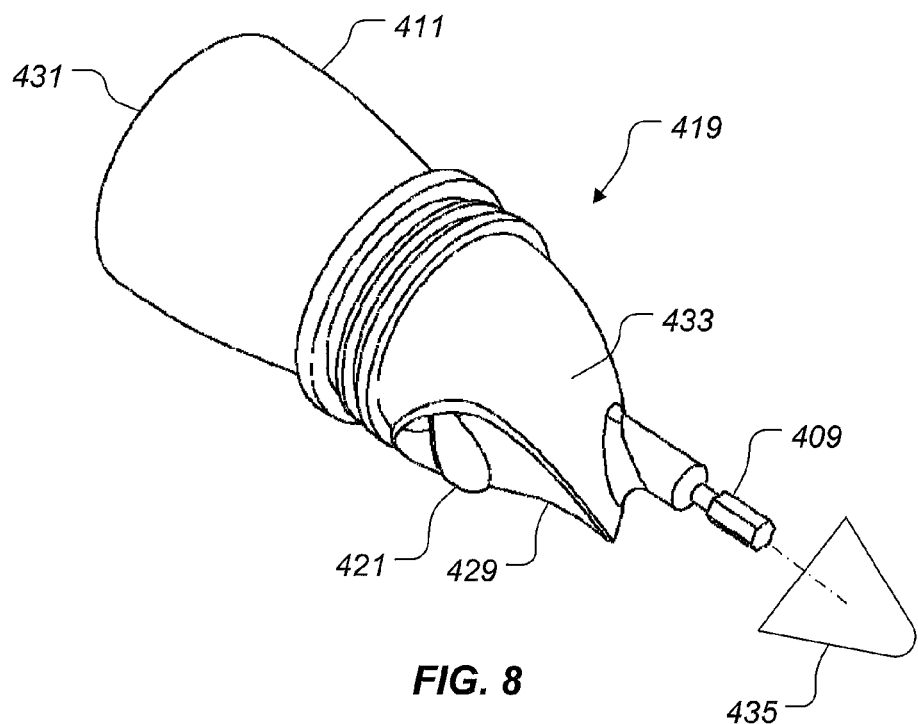
FIG. 8 is a perspective view of a rotating sleeve valve assembly of the propulsive anti-torque system of FIG. 4.

Referring to FIG. 8, rotating sleeve valve 419 is rotatably mounted inside fixed nozzle assembly 401 such that a forward sleeve opening 431 of diverter 411 is concentric with duct 117. Rotating sleeve valve 419 includes a scoop 433 for aerodynamically turning mixed air 129d into selected nozzles of the fixed nozzle assembly 401. A sleeve vane 421 is preferably fixedly located in a scoop opening 429 of scoop 433, so as to facilitate the turning of mixed air 129d. In an alternative embodiment, sleeve vane 421 may be configured to selectively rotate so as to accommodate changes in flow characteristics of mixed air 129d. Actuator spindle 409 is located on an aft portion of rotating sleeve valve 419. Rotating sleeve valve 419 is operably associated with an actuator 435. Actuator 435, which is schematically shown in FIG. 8, is configured to selectively rotate rotating sleeve valve 419, via spindle 409, into desired positions. Positioning of rotating sleeve valve 419 is preferably controlled by an aircraft flight control computer, but may also be controlled by manual inputs by the pilot. In the preferred embodiment, actuator 435 is electric. However, it should be appreciated that actuator 435 can be a wide variety of devices capably of selectively positioning rotating sleeve valve 419, via actuator spindle 409, into desired positions.

Referring again to FIGS. 4-9, rotating sleeve valve 419 directs mixed air 129d from diverter 411 into one or more nozzles on fixed nozzle assembly 401. Anti-torque nozzle 403 is preferably elliptically shaped and protrudes in an outboard direction from the main body portion of fixed nozzle assembly 401. In alternative embodiments, anti-torque nozzle 403 can be of a wide variety of shapes, such as trapezoidal. Anti-torque nozzle 403 preferably has one or more anti-torque vanes 423 for directing the flow of mixed air 129d in an anti-torque direction. In the preferred embodiment, each anti-torque vane 423 is fixed to the interior side walls of anti-torque nozzle 403. In alternative embodiments, each anti-torque vane 423 may be articulated such that each vane 423 is rotatable on a generally horizontal axis so as to selectively contribute pitch control of aircraft 101. During operation, rotating sleeve valve 419 is positioned to direct air through anti-torque nozzle 403, so as to produce an anti-torque vector 413 due to the propulsive forces from air 129d being directed through anti-torque nozzle 403. Aircraft 101 is configured such that rotor system 105 rotates in a counter clockwise direction 131, as shown in FIG. 1. In such a configuration, anti-torque vector 413 acts to cancel torque induced upon aircraft from the rotation of rotor system 105 in counter clockwise direction 131. Furthermore, anti-torque vector 413 is selectively generated for yaw maneuvering and yaw stability, in addition to anti-torque control. It should be appreciated that other embodiments of aircraft 101 may have a rotor system which rotates is a clockwise direction (opposite from counter clockwise direction 131). In such a configuration, propulsive anti-torque system 103 would be configured such that anti-torque nozzle 403 would be on the opposite side of aircraft 101.

Pro-torque nozzle 405 is preferably elliptically shaped and protrudes in an outboard direction from the main body portion of fixed nozzle assembly 401. In alternative embodiments, pro-torque nozzle 405 can be of a wide variety of shapes, such as trapezoidal. Pro-torque nozzle 405 preferably has one or more pro-torque vanes 425 for directing the flow of mixed air 129d in the desired pro-torque direction. In the preferred embodiment, each pro-torque vane 425 is fixed to the interior side walls of pro-torque nozzle 405. In alternative embodiments, each pro-torque vane 425 may be articulated such that each vane 425 is rotatable on a generally horizontal axis so as to selectively contribute to pitch control of aircraft 101. During operation, rotating sleeve valve 419 directs air through pro-torque nozzle 405 to produce a pro-torque vector 415. Furthermore, pro-torque vector 415 is selectively generated for yaw maneuvering and yaw stability.

Figure 5:
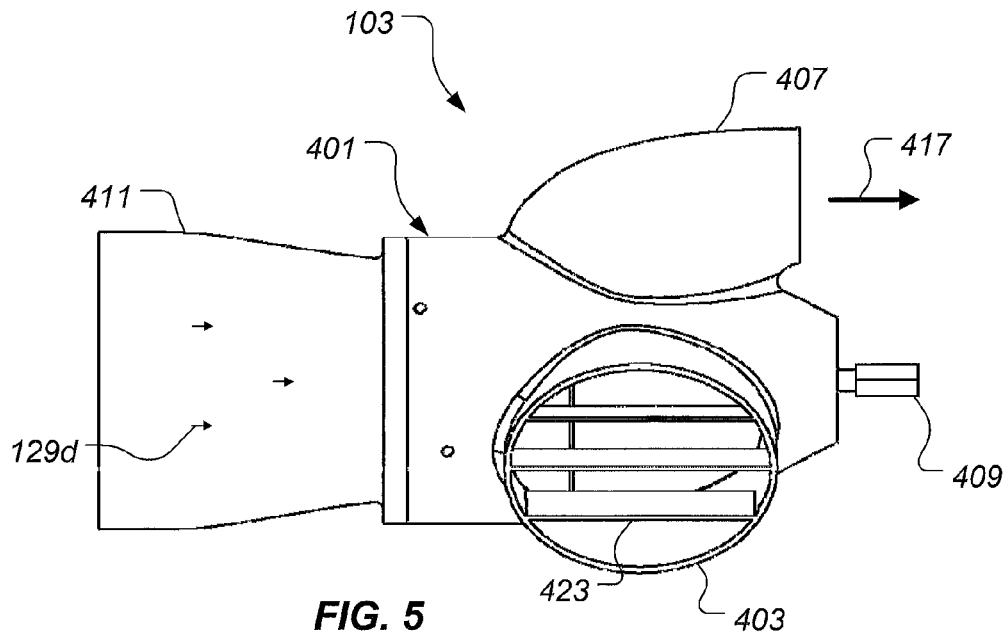
FIG. 5 is a side view of the propulsive anti-torque system of FIG. 4.
Figure 6:
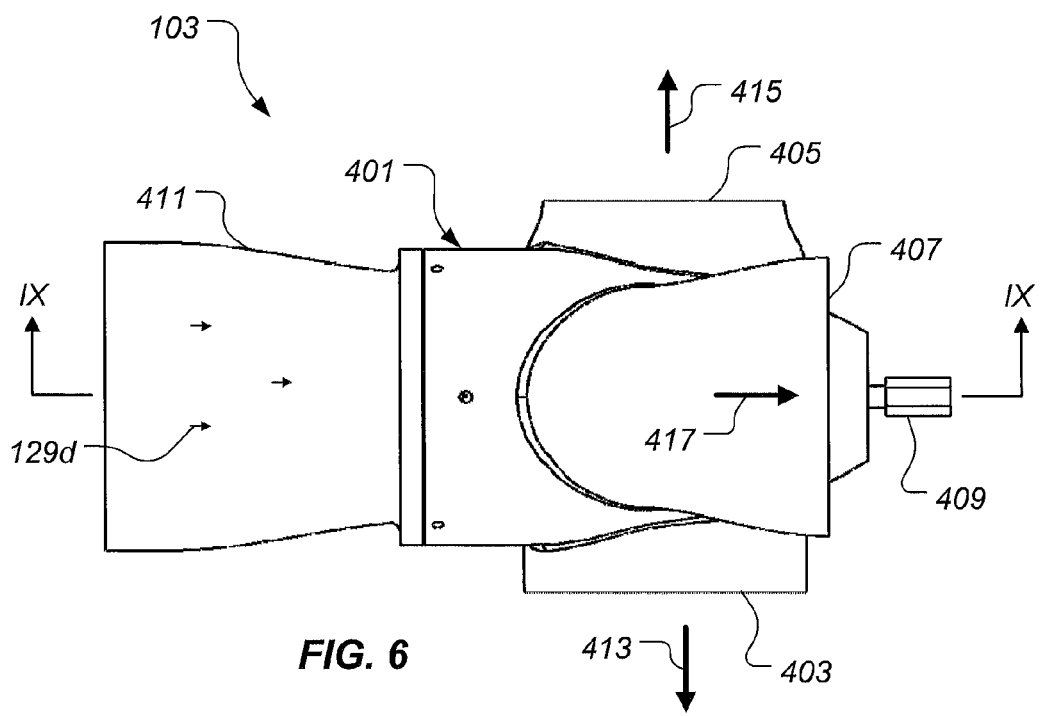
FIG. 6 is a top view of the propulsive anti-torque system of FIG. 4.
Figure 7:
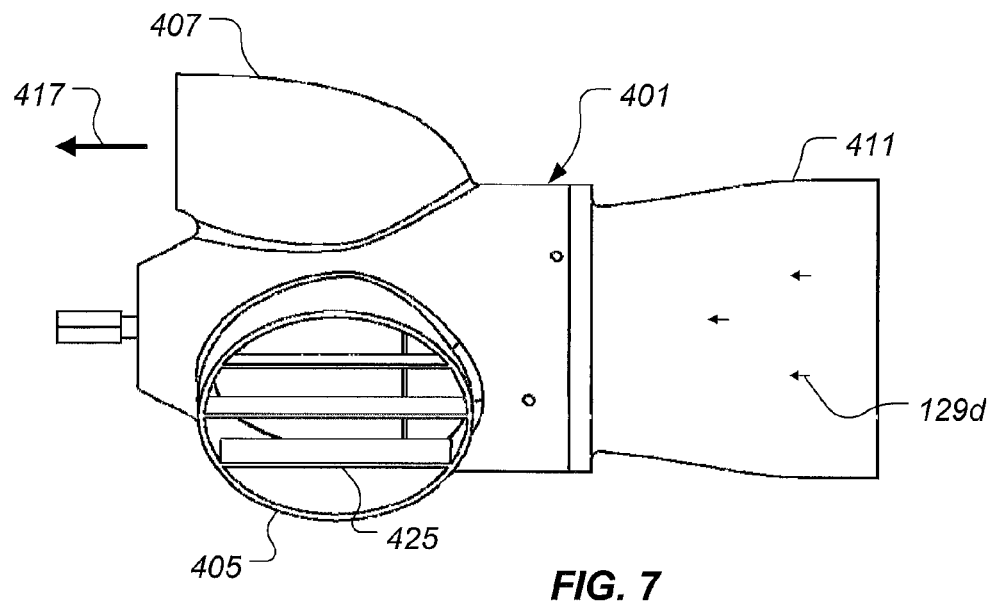
FIG. 7 is an additional side view of the propulsive anti-torque system of FIG. 4.

Thrust nozzle 407 is preferably scoop shape so as to extend upward and toward an aft direction, as shown in FIG. 5. Thrust nozzle 407 preferably includes a thrust vane 427 for directing the flow of mixed air 129d in the desired thrust direction. In the preferred embodiment, thrust vane 427 is fixed to the interior side walls of thrust nozzle 407. In alternative embodiments, thrust vane 427 may be articulated such that thrust vane 427 is rotatable. During operation, rotating sleeve valve 419 directs air through thrust nozzle 407 to produce a forward thrust vector 417. Forward thrust vector 417 is selectively generated to contribute to forward propulsion of aircraft 101.

In operation, rotating sleeve valve 419 is selectively rotated to direct mixed air 129d into one or more of anti-torque nozzle 403, pro-torque nozzle 405, and thrust nozzle 407. For example, sleeve valve 419 may be positioned to direct all of mixed air 129d into anti-torque nozzle 403 to produce anti-torque vector 413. Similarly, sleeve valve 419 may be positioned to direct all of mixed air into pro-torque nozzle 405 to produce pro-torque vector 415. Similarly, sleeve valve 419 may be positioned to direct all of mixed air into thrust nozzle 407 to produce forward thrust vector 417. In addition, sleeve valve 419 may be actuated so as to direct mixed air 129d into both anti-torque nozzle 403 and thrust nozzle 407 simultaneously so as to produce a resultant vector which is a combination of anti-torque vector 413 and forward thrust vector 417. Sleeve valve 419 may be rotated so as to selectively adjust the proportion of mixed air 129d that travels through anti-torque nozzle 403 and thrust nozzle 407, thereby changing the resultant vector that forms from the combination of anti-torque vector 413 and forward thrust vector 417. For example, 30% of mixed air 129d may be directed through anti-torque nozzle 403 with 70% of mixed air 129d being directed through thrust nozzle 407, so as to produce a resultant vector force that is 30% of anti-torque vector 413 and 70% forward thrust vector 417. In a similar manner, sleeve valve 419 may be actuated so as to simultaneously direct mixed air 129d into both pro-torque nozzle 405 and thrust nozzle 407 so as to produce a resultant vector which is a combination of pro-torque vector 415 and forward thrust vector 417.

Figure 9:
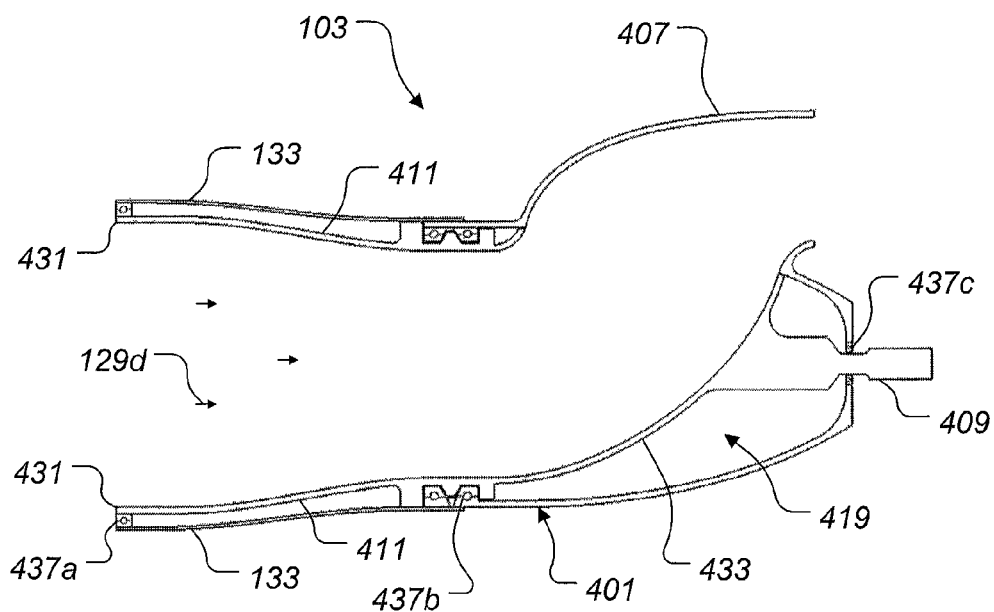
FIG. 9 is cross-sectional view of the propulsive anti-torque system, taken along the section lines IX-IX shown in FIG. 6.

Referring to FIG. 9, system 103 is depicted in a cross-sectional view with sleeve valve 419 positioned to direct airflow through thrust valve 407. A bearing 437a is located between diverter 411 and tailboom 133. In the preferred embodiment, diverter 411 is integral with rotating sleeve valve 419 such that diverter 411 rotates with rotating sleeve valve 419. However, it should be appreciated that alternative embodiments can be configured with diverter 411 as a stationary separate structure from rotating sleeve valve 419. A bearing 437b is located between rotating sleeve valve 419 and fixed nozzle assembly 401 to facilitate rotational movement therebetween. Similarly, a bearing 437c is located between spindle 409 and fixed nozzle assembly 401.

The system of the present application provides significant advantages, including: (1) increasing the speed of the aircraft; (2) blade loading and flapping are significantly reduced; (3) the margins for hub and control loads are improved; (4) the quality of the ride at high speeds is significantly improved; (5) the noise level is significantly reduced; (6) system complexity is greatly reduced; (7) the infrared (IR) signature of the rotorcraft is significantly reduced, because the primary engine exhaust is highly diluted when mixed with the air flow from the fan; (8) the acoustic signature of the rotorcraft is greatly reduced, because both the primary engine and the propulsive anti-torque system are internal to the tail boom of the rotorcraft; (9) the rotorcraft is significantly safer for personnel during ground operations, because both the primary engine and the propulsive anti-torque system are internal to the tail boom of the vehicle, thereby eliminating the possibilities of exposure to hot exhaust gasses or tail rotor strikes; and (10) anti-torque thrust is provided without the cost, weight, and complexity of a tail-rotor type device or a thrust type device that uses a fan driven by a secondary drive system.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that a system with significant advantages has been described and illustrated. Although the system of the present application is shown in a limited number of forms, it is not limited to just these forms, but is amenable to various changes and modifications without departing from the spirit thereof.

The invention claimed is:

1. A propulsive anti-torque system for an aircraft, the propulsive anti-torque system comprising:
   a fixed nozzle assembly comprising:
      an anti-torque nozzle;
      a pro-torque nozzle;
      a thrust nozzle;
   a diverter in fluid communication with a duct located inside a tailboom, the diverter having a forward sleeve opening so as to receive mixed air from the duct, the diverter located forward of the fixed nozzle assembly;
   a rotating sleeve valve disposed within the fixed nozzle assembly so as to receive the mixed air downstream from the diverter, the rotating sleeve valve comprising:
      a scoop portion having a curved shape concave to the flow of air configured to redirect the mixed air from the diverter into at least one of: the anti-torque nozzle, the pro-torque nozzle, and the thrust nozzle;
   an actuator configured to selectively rotate the rotating sleeve valve such that the mixed air is redirected in the fixed nozzle assembly.

2. The propulsive anti-torque system according to claim 1, wherein the diverter portion is approximately concentric with the duct.

3. The propulsive anti-torque system according to claim 1, wherein the airflow through the thrust nozzle produces a forward thrust vector on the aircraft.

4. The propulsive anti-torque system according to claim 1, wherein the airflow through the anti-torque nozzle produces an anti-torque vector, thereby producing a torque on the aircraft.

5. The propulsive anti-torque system according to claim 1, wherein the airflow through the pro-torque nozzle produces a pro-torque vector, thereby producing a torque on the aircraft.

6. The propulsive anti-torque system according to claim 1, wherein the airflow through the anti-torque nozzle and the thrust nozzle produces a resultant force which is a combination of an anti-torque vector and a thrust vector.

7. The propulsive anti-torque system according to claim 1, wherein the airflow is pressurized by an engine and a fan.

8. The propulsive anti-torque system according to claim 1, wherein the anti-torque nozzle comprises:
   at least one anti-torque vane for directing the airflow in an anti-torque producing direction.

9. The propulsive anti-torque system according to claim 1, wherein the pro- torque nozzle comprises:
   at least one pro-torque vane for directing the airflow in a pro-torque producing direction.

10. The propulsive anti-torque system according to claim 1, wherein the thrust nozzle comprises:

at least one thrust vane for directing the airflow in a thrust producing direction.

11. The propulsive anti-torque system according to claim 1, wherein the rotating sleeve valve further comprises:
a sleeve vane located in the scoop portion so as to increase the aerodynamic efficiency of the scoop portion in turning the airflow into at least one of: the anti-torque nozzle, the pro-torque nozzle, and the thrust nozzle.

12. An aircraft comprising:
an engine which provides power to a main rotor system;
a fan;
a duct within a tailboom, wherein the duct acts as a conduit to provide airflow to a propulsive anti-torque system, the airflow being a mixture of compressed air from the fan and exhaust from the engine;
a propulsive anti-torque system located near an aft end of the tailboom, the propulsive anti-torque system comprising:
a fixed nozzle assembly comprising:
an anti-torque nozzle;
a pro-torque nozzle;
a thrust nozzle;
a diverter in fluid communication with the duct, the diverter having a forward sleeve opening so as to receive mixed air from the duct, the diverter located forward of the fixed nozzle assembly;
a rotating sleeve valve disposed within the fixed nozzle assembly so as to receive the mixed air downstream from the diverter, the rotating sleeve valve comprising:
a scoop portion having a curved shape concave to the flow of air configured to redirect the mixed air from the diverter into the thrust nozzle and at least one of: the anti-torque nozzle and the pro-torque nozzle;
an actuator configured to selectively rotate the rotating sleeve valve such that selectively rotating the rotating sleeve valve redirects airflow into at least one of: the anti-torque nozzle, the pro-torque nozzle, and the thrust nozzle.

13. The aircraft according to claim 12, wherein the airflow through the thrust nozzle produces a forward thrust vector on the aircraft.

14. The aircraft according to claim 12, wherein the airflow through the anti-torque nozzle produces an anti-torque vector, thereby producing a torque on the aircraft.

15. The aircraft according to claim 12, wherein the airflow through the pro-torque nozzle produces a pro-torque vector, thereby producing a torque on the aircraft.

16. The aircraft according to claim 12, wherein the airflow through the anti-torque nozzle and the thrust nozzle produces a resultant force which is a combination of an anti-torque vector and a thrust vector.

17. The aircraft according to claim 12, wherein the airflow is pressurized by an engine and a fan.

* * * * *